United States Patent
Takada

(10) Patent No.: US 10,267,087 B2
(45) Date of Patent: Apr. 23, 2019

(54) INTAKE-EXHAUST UNIT AND DOUBLE SKIN SYSTEM USING SAME

(71) Applicant: Device Co.,Ltd., Mito-shi, Ibaraki (JP)

(72) Inventor: Yoshimichi Takada, Mito (JP)

(73) Assignee: Device Co., Ltd., Mito-shi (JP)

(*) Notice: Subject to any disclaimer, the term of this patent is extended or adjusted under 35 U.S.C. 154(b) by 355 days.

(21) Appl. No.: 15/312,095

(22) PCT Filed: Feb. 10, 2016

(86) PCT No.: PCT/JP2016/053889
§ 371 (c)(1),
(2) Date: Nov. 17, 2016

(87) PCT Pub. No.: WO2016/152296
PCT Pub. Date: Sep. 29, 2016

(65) Prior Publication Data
US 2017/0191309 A1    Jul. 6, 2017

(30) Foreign Application Priority Data

Mar. 24, 2015 (JP) .................. 2015-060563

(51) Int. Cl.
*E06B 7/02* (2006.01)
*E04B 2/88* (2006.01)
(Continued)

(52) U.S. Cl.
CPC .................. *E06B 7/02* (2013.01); *E04B 2/88* (2013.01); *E06B 3/66* (2013.01); *E06B 7/10* (2013.01);
(Continued)

(58) Field of Classification Search
CPC .......... F24F 2221/20; E06B 7/02; E06B 2/88; E06B 7/10
(Continued)

(56) References Cited

U.S. PATENT DOCUMENTS

2014/0182833 A1    7/2014    Helt et al.
2016/0130859 A1    5/2016    Takada

FOREIGN PATENT DOCUMENTS

JP    59-173644 A    10/1984
JP    2000-88309 A    3/2000
(Continued)

OTHER PUBLICATIONS

International Search Report (PCT/ISA/210) issued in PCT Application No. PCT/JP2016/053889 dated May 17, 2016, with English translation (four (4) pages).
(Continued)

*Primary Examiner* — Helena Kosanovic
(74) *Attorney, Agent, or Firm* — Crowell & Moring LLP

(57) ABSTRACT

Provided is an intake-exhaust unit that easily controls the flow of air in an intermediate cavity of a double skin structure window glass, and a double skin system using the same. The intake-exhaust unit is comprised of: a first distribution port of passage of the air; a second distribution port of passage of the air, the second distribution port being separated from the first distribution port; a third distribution port of passage of the air, the third distribution port being separated from the first distribution port and the second distribution port; a fan for sending out the sucked air; a negative-pressure passage provided on the air-sucking side of the fan, the negative-pressure passage having intake holes that communicates with the first, the second, and the third distribution ports; and a positive-pressure passage provided on the air exhausting side of the fan, the positive-pressure passage having an exhaust hole that communicates with the first, the second, and the third distribution ports, wherein the air is sucked from any of the first, the second, and the third distribution ports; and the air is exhausted from any of the
(Continued)

distribution port other than the port in use for sucking the air among the first, the second, and the third distribution ports.

5 Claims, 13 Drawing Sheets

(51) Int. Cl.
*E06B 3/66* (2006.01)
*E06B 9/264* (2006.01)
*E06B 7/10* (2006.01)
*F24F 7/00* (2006.01)

(52) U.S. Cl.
CPC ............... *E06B 9/264* (2013.01); *F24F 7/00* (2013.01); *E06B 2007/023* (2013.01); *E06B 2007/026* (2013.01); *E06B 2009/2643* (2013.01); *F24F 2221/20* (2013.01); *Y02A 30/272* (2018.01); *Y02B 10/20* (2013.01); *Y02B 10/24* (2013.01)

(58) Field of Classification Search
USPC .......................................................... 454/212
See application file for complete search history.

(56) References Cited

FOREIGN PATENT DOCUMENTS

| JP | 2001-349154 A | 12/2001 |
| JP | 2005-240278 A | 9/2005 |
| JP | 2011-132719 A | 7/2011 |
| JP | 5658813 B1 | 12/2014 |
| WO | WO 2014/086368 A1 | 6/2014 |

OTHER PUBLICATIONS

Japanese-language Written Opinion (PCT/ISA/237) issued in PCT Application No. PCT/JP2016/053889 dated May 17, 2016 (three (3) pages).

International Preliminary Report on the Patentability (PCT/IB/326) issued in PCT Application No. PCT/JP2016/053889 dated Oct. 5, 2017 with English-language translation (Eleven (11) pages).

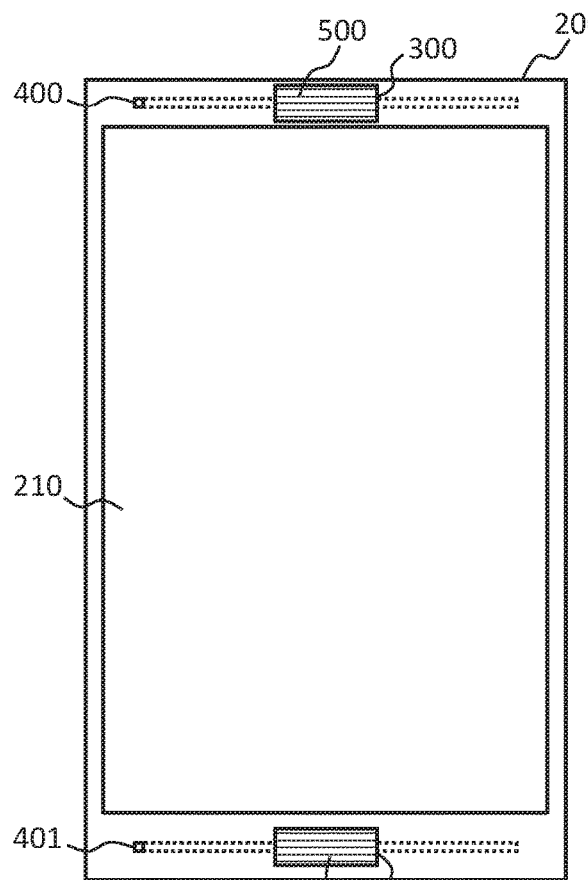
FIG. 1A Front view
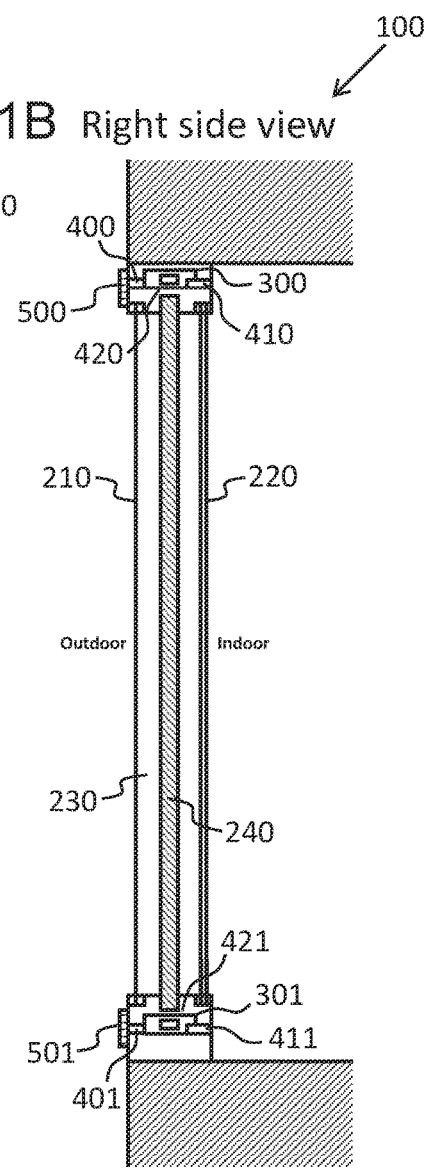
FIG. 1B Right side view
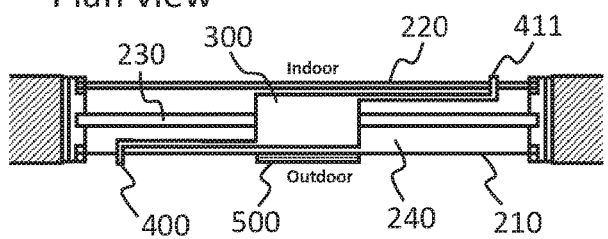
FIG. 1C Plan view

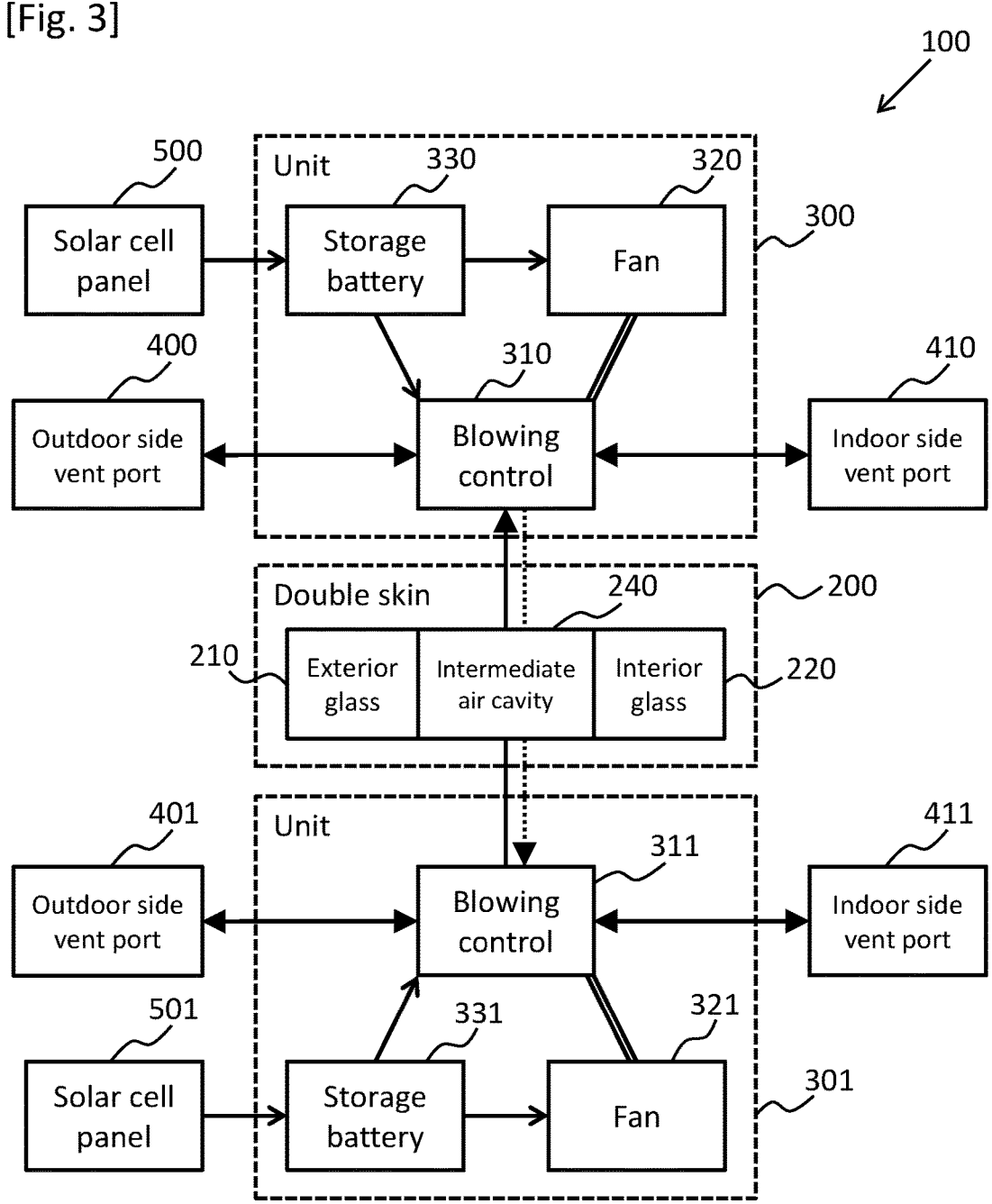
[Fig. 3]

[Fig. 4]
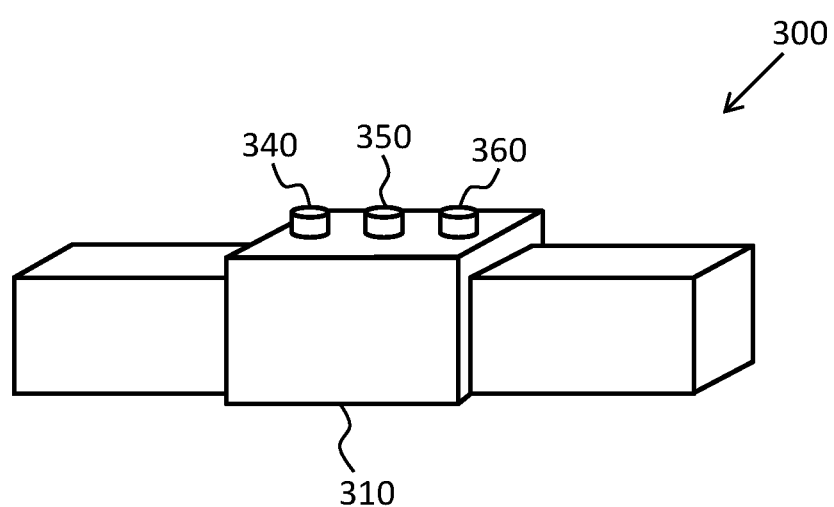

Plan view

Front view

Left side view

A cross-sectional view

C cross-sectional view

B cross-sectional view

D cross-sectional view

E cross-sectional view

Upper unit

Lower unit

Upper unit

Lower unit

Upper unit

Lower unit

Upper unit

Lower unit

Upper unit

Lower unit

Upper unit

Lower unit

INTAKE-EXHAUST UNIT AND DOUBLE SKIN SYSTEM USING SAME

TECHNICAL FIELD

The present invention relates to an intake-exhausting unit that controls airflow inside the intermediate cavity of a double skin structure window glass and relates to a double skin system that uses the same.

BACKGROUND ART

In conventional buildings, many window glasses almost use a single plate glass. The heat efficiency of this construction is very bad. Since a plate glass easily allows heat transfer, a place in the sun in a room becomes hot; in contrast, an inner place of the room is left cold. If there is a non-uniformity of the temperature in a room, effectiveness of heating and cooling equipment also becomes bad, energy efficiency as well is poor. This means that heat is not used effectively for maintaining an appropriate room temperature.

As described in Patent Literature 1, an invention of an interior glass skin structure for a double glass skin has also been disclosed. This invented structure is, by forming a double skin structure by placing an inner glass (interior glass) on the room side of a plate glass (exterior glass), capable of reducing the thermal load on the window surface caused by insolation or the like during cooling, and enhancing the heating efficiency by heat recovery of the air warmed by insolation or the like during heating. In particular, the use of warm air in winter season is an energy saving method that can be workable through the passage of intake of the air from a room, heat exchange in the intermediate cavity, and then exhaust into the room; it is therefore difficult to build this configuration easily in the conventional method.

Upon making a window glass the double skin structure, first, it is necessary that cleaning of the glass and the maintenance of blinds in the intermediate cavity can be implemented without providing a maintenance deck. Note however that this need has been fulfilled by the invention described in Patent Literature 1. Next, it is also necessary that the control of the air in the intermediate cavity provided between the exterior glass and the interior glass should be easy and reliable to endure a long-term practical use with little maintenance.

To control the air at the intermediate cavity, the intake-exhaust ports are provided at the top and bottom on the exterior glass side, and the ports are opened or closed manually or automatically to allow intake or exhaust of the outside air. In the case of a curtain wall of aluminum (detachable wall), there is a system in which an outside air introduction mechanism is incorporated between horizontal members or between vertical members. In this system however, prediction of the effect is difficult because the system is a natural ventilation system, of which intake-exhaust performance is dependent on the variation of the wind direction or the wind speed.

The interior glass side that does not contact with the outside air directly should have at least earthquake-resistant performance. However, the performance of wind pressure resistance should be considered, because the intermediate cavity takes in the outside air. The performance of wind pressure resistance of the interior glass is determined by the wind speed according to the area of the intake-exhaust port on the exterior glass side under the condition of the port being open; it is necessary to assume a several-fold value of the determined value from the point of view of safety. In addition, the wind speed tolerable in use, though dependent on the area of the intake-exhaust ports, is about 10 meters per second; in particular, when a blind is installed in the intermediate cavity, the intake-exhaust becomes difficult when the wind speed exceeds 10 meters per second. Further, it is also difficult to install a filter at the intake-exhaust port when the ports take in the outside air is considered; and the number of the maintenance operations for the inside will increase.

In the case of natural intake-exhaust, a long-time-assured performance is also required with respect to a reliable operation of complete sealing and opening under the designed wind pressure. If not used for a long time, the sealing material may stick or the operating mechanism may have a trouble; a maintenance plan assuming it is also necessary. In addition, if the intake-exhaust ports are left open at the time of a strong winds or rain particularly a storm, the internal pressure of the intermediate cavity increases, affecting the blind and the interior glass developing into a big problem. An attempt to overcome the problem described above cannot escape from a high expenditure in the present circumstances.

LITERATURES OF RELATED ART

Patent Literatures

[Patent Literature 1]
Japanese patent gazette: Patent No. 5658813

SUMMARY OF INVENTION

Technical Problems

Even if a window glass has a double skin structure like the one described in Patent Literature 1, it is meaningless unless heat is effectively used by, such as, accumulating the air in the intermediate cavity. It is also meaningless if an attempt to make the use of heat effective invites complicated or high-cost installations or a little effect. If such matters can be solved, the barrier to introduction of the double skin structure will become low.

Thus, an object of the present invention is to provide an intake-exhaust unit that easily controls the flow of the air in the intermediate cavity of a window glass of a double skin structure and a double skin system that uses the same.

Solution to Problem

To solve the above-stated problem, an intake-exhaust unit of the first invention is comprised of:

a first distribution port of passage of the air;

a second distribution port of passage of the air, the second distribution port being separated from the first distribution port;

a third distribution port of passage of the air, the third distribution port being separated from the first distribution port and the second distribution port;

a fan for sending out the sucked air;

a negative-pressure passage provided on the air-intake side of the fan, the negative-pressure passage having a first intake hole that communicates with the first distribution port, a second intake hole that communicates with the second distribution port, and a third intake hole that communicates with the third distribution port;

a positive-pressure passage provided on the air exhausting side of the fan, the positive-pressure passage having
a first exhaust hole connected to the first distribution port,
a second exhaust hole connected to the second distribution port, and a third exhaust hole connected to the third distribution port;
a negative-pressure passage side shutter having a hole provided slidably on the negative-pressure passage;
a positive-pressure passage side shutter having a hole provided slidably on the positive-pressure passage; and
a blowing control module for driving the negative-pressure passage side shutter and the positive-pressure passage side shutter;
wherein
the blowing control module slides the negative-pressure passage side shutter so that the hole of the negative-pressure passage side shutter matches to any of the first intake hole, the second intake hole, and the third intake hole, thereby the negative-pressure passage is communicated with any of the first distribution port, the second distribution port, and the third distribution port;
wherein
the blowing control module slides the positive-pressure passage side shutter so that the hole of the positive-pressure passage side shutter matches to any of the first exhaust hole, the second exhaust hole, and the third exhaust hole,
thereby the positive-pressure passage is communicated with any of the distribution ports other than the one communicated with the negative-pressure passage, among the first distribution port, the second distribution port, and the third distribution port; and
wherein
the air is taken in through the negative-pressure passage to the fan from any of the first distribution port, the second distribution port, and the third distribution port, and
the sucked air is then sent out to any of the distribution ports other than the one in use for the air sucking, among the first distribution port, the second distribution port, and the third distribution port.

In addition, the intake-exhaust unit of the first invention is characterized in that
the negative-pressure passage is partitioned into the lower side and the positive-pressure passage is partitioned into the upper side, considering the fan to be a border;
the first distribution port and the first intake hole, and the first distribution port and the first exhaust hole are communicated via a first sectioned passage,
the second distribution port and the second intake hole, and the second distribution port and the second exhaust hole are communicated via a second sectioned passage, and
the third distribution port and the third intake hole, and the third distribution port and the third exhaust hole are communicated via a third sectioned passage;
the first intake hole, the second intake hole, and the third intake hole are provided in the lower side of front of each of the first sectioned passage, the second sectioned passage, and the third sectioned passage, wherein the lower side is communicated with the negative-pressure passage; and
the first exhaust hole, the second exhaust hole, and the third exhaust hole are provided in the upper side of rear of each of the first sectioned passage, the second sectioned passage, and the third sectioned passage, wherein the upper side is communicated with the positive-pressure passage.

Further, the intake-exhaust unit of the first invention is characterized in that
the unit has a storage battery that stores electricity generated by a solar cell and supplies the power to the blowing control module that drives the fan, the negative-pressure passage side shutter, and the positive-pressure passage side shutter,
wherein the blowing control module slides the negative-pressure passage side shutter and the positive-pressure passage side shutter in accordance with a predetermined movement pattern.

A double skin system which is the second invention is characterized in that
the intake-exhaust unit of the first invention is arranged on the top and the bottom of a window glass having a double skin structure comprised of
an exterior glass arranged on the outdoor side,
an interior glass arranged on the indoor side, and
an intermediate cavity created by the exterior glass and the interior glass,
wherein the intake-exhaust unit sucks and exhausts the air among the outdoor side, the indoor side, and the intermediate cavity.

An intake-exhaust method which is the third invention is characterized in that the configuration in the double skin system of the second invention is employed in a composition,
wherein
the intake-exhaust unit arranged on the bottom exhausts the air sucked from the outdoor side or the indoor side into the intermediate cavity and
the intake-exhaust unit arranged on the top exhausts the air sucked from the intermediate cavity into the outdoor side or the indoor side.

Advantageous Effect of Invention

The controlling of the flow of air in the intermediate cavity in the window glass of the double-skin structure by the intake-exhaust unit of the present invention enables to take the air warmed in the intermediate cavity into the room and to exhaust such air to the outdoor. In addition, applying the double skin system using the intake-exhaust units to the window glass of a building enables to improve easily the thermal efficiency of the building.

BRIEF DESCRIPTION OF DRAWINGS

FIG. 1 This illustrates the double skin system that uses the intake-exhaust unit of the present invention, wherein FIG. 1A is a front view of the system, FIG. 1B is a right side view of the same, and FIG. 1C is a plan view of the same.

FIG. 2 This illustrates the double skin system that uses the intake-exhaust unit of the present invention, wherein

FIG. 3 This is a block diagram to illustrate the configuration of the double skin system that uses the intake-exhaust unit of the present invention.

FIG. 4 This is a perspective view of the intake-exhaust unit of the present invention.

FIG. 5 This illustrates the intake-exhaust unit of the present invention, wherein

FIG. 6 This is a cross-sectional view of the intake-exhaust unit of the present invention, wherein

FIG. 7 This is a cross-sectional view of the internal configuration of the intake-exhaust unit of the present invention, wherein

FIG. 8 This illustrates the working of the intake-exhaust unit of the present invention in the winter season (no insulation), wherein

FIG. 9 This illustrates the working of the intake-exhaust unit of the present invention in the winter season (indoor to indoor), wherein

FIG. 10 This illustrates the working of the intake-exhaust unit of the present invention in the summer season (outdoor to outdoor), wherein

FIG. 11 This illustrates the working (indoor to outdoor) of the intake-exhaust unit of the present invention in the summer season, wherein

FIG. 12 This illustrates the working (outdoor to indoor) of the intake-exhaust unit of the present invention in the intermediate season, wherein

FIG. 13 This illustrates the working (ventilation) of the intake-exhaust unit of the present invention in the intermediate season, wherein

MODE OF IMPLEMENTING INVENTION

Figures 2A, 2B, 2C:
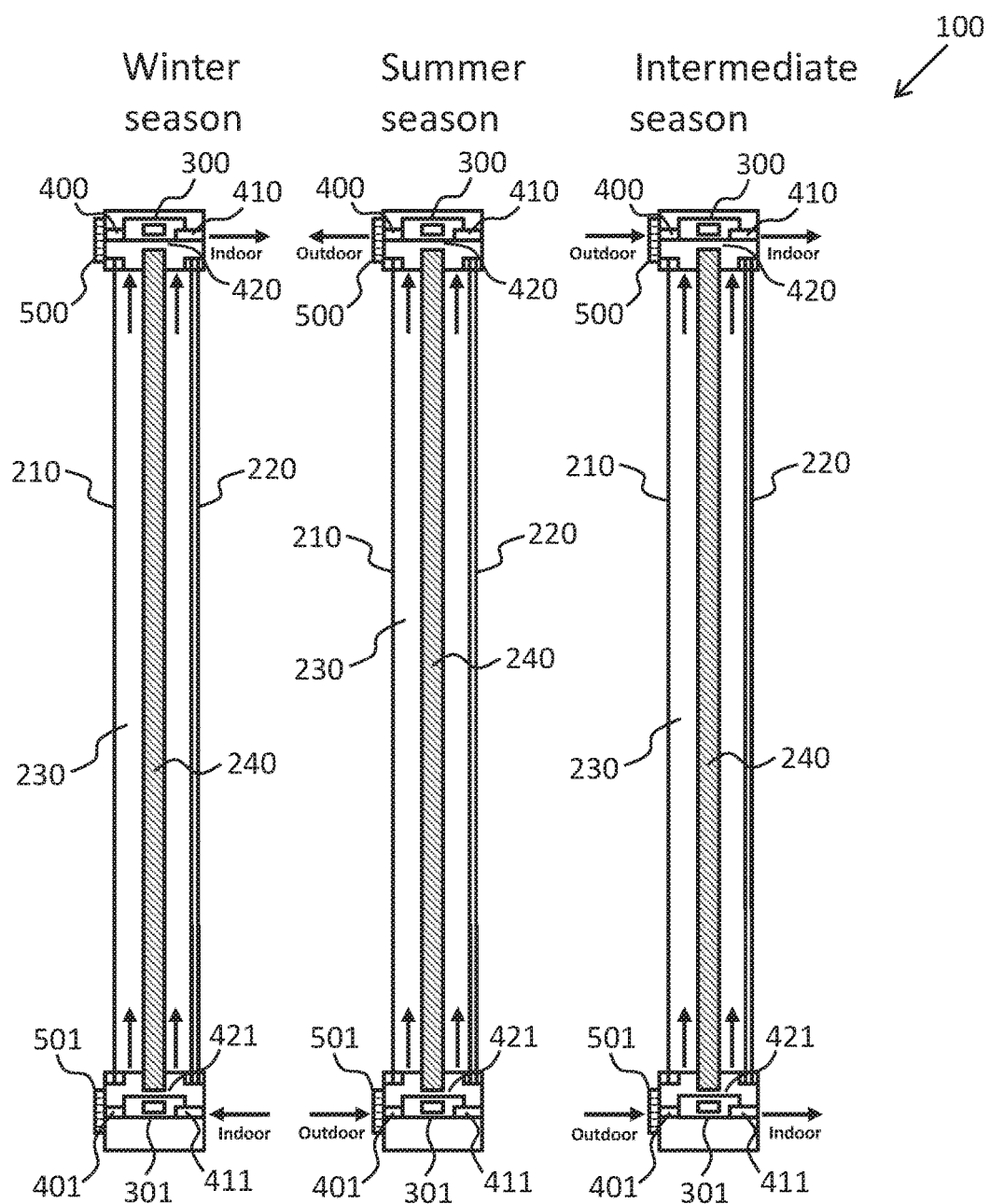
FIG. 2A illustrates the aspects of the controlling of the intake-exhaust in the winter season.
FIG. 2B illustrates the same in the summer season.
FIG. 2C illustrates the same in the intermediate season.

The following details modes of implementing the present invention referring to drawings. A constituent having the same function is given the same reference numeral and the explanation of such repetition is sometimes omitted depending on the context.

Embodiment 1

First, explained is a double skin system that uses the intake-exhaust unit of the present invention. FIG. 1(a) is a front view of a window glass that uses the double skin system. FIG. 1(b) is a right side view of the window glass that uses the double skin system. FIG. 1(c) is a plan view of the window glass that uses the double skin system. A double skin system 100 has a configuration that is used in the each of the plural window glasses installed in a building. As FIG. 1(a) shows, the double skin system 100 has, at least, a double skin 200, an upper side intake-exhaust unit 300, and a lower side intake-exhaust unit 301.

The double skin 200 is the opening of a window glass and has, at least, an exterior glass 210 and an interior glass 220 as shown in FIG. 1(b). The exterior glass 210 uses a plate glass similar to a conventional window glass. The interior glass 220 uses a double-glazing glass, which is a thermal insulating material. The double-glazing glass consists of multiple layers of plate glass with air or gas sealed in a cavity between them; or instead, the cavity between them is maintained in the vacuum state.

Since the exterior glass 210 is disposed on the outdoor side, heat flows easily in and out therethrough; in contrast, flow of heat through the interior glass 220 hardly occurs, because it is disposed on the indoor side. In lamination of the exterior glass 210 and the interior glass 220, a predetermined gap is provided between them to create an intermediate cavity 230. The intermediate cavity 230 is a space that allows the air to pass through freely. The air is warmed by the heat in the intermediate cavity 230 coming from the outdoor through the exterior glass 210, but that heat from the intermediate cavity 230 is difficult to enter the indoor through the interior glass 220.

A blind 240 may be disposed in the intermediate cavity 230. The blind 240 has a plurality of vertically arrayed louvers of horizontally long. Changing the angle of each louver controls the field of vision or the light and heat from the outdoor. The blind 240 may use the one provided in advance in the intermediate cavity 230 or, instead, may be installed separately on the indoor side.

As FIG. 1(c) shows, the intake-exhaust unit 300 is installed on the top of the double skin 200 and controls the air flow among the outdoor, the indoor, and the intermediate cavity 230 of the double skin 200. Between the intake-exhaust unit 300 and the outdoor, the air is allowed to flow through an outer vent port 400. Between the intake-exhaust unit 300 and the indoor, the air is allowed to flow through an inner vent port 410. Between the intake-exhaust unit 300 and the intermediate cavity 230, the air is allowed to flow through a middle vent port 420.

Similarly, the intake-exhaust unit 301 is installed at the bottom of the double skin 200 to control the flow of the air among the outdoor, the indoor, and the intermediate cavity 230 of the double skin 200. Between the intake-exhaust unit 301 and the outdoor, the air is allowed to flow through an outer vent port 401. Between the intake-exhaust unit 301 and the indoor, the air is allowed to flow through an inner vent port 411. Between the intake-exhaust unit 301 and the intermediate cavity 230, the air is allowed to flow through a middle vent port 421.

The intake-exhaust units 300 and 301 are integrated devices; in each of them, the natural intake-exhaust function of the outside air through an intermediate cavity 230 as the main passage of the flow of air, and the indoor intake and the indoor exhaust function are incorporated into one device. Motorizing the selection of volume of the air and the passage of intake-exhaust in the intake-exhaust units 300 and 301 controls automatically the environment in a building, and in addition, enables manual control.

When the air pressure difference between the indoor and the outdoor is large such as in high-rise buildings or the wind is strong, it is rare to open the window; the air-tightness is maintained high. Even if the outer vent ports 400 and 401 are opened a little, natural ventilation of the air is difficult. Generating forcibly the flow of air by providing the intake-exhaust units 300 and 301, the air is taken in and exhausted through the outer vent ports 400 and 401. Additionally, when the outer vent ports 400 and 401 are made about four square centimeters, ensuring the volume of air is possible.

The power for controlling the flow of air by the intake-exhaust unit 300 is supplied from a solar cell 500. Similarly, the power for controlling the flow of air by the intake-exhaust unit 301 is supplied from a solar cell 501. The solar cells 500 and 501 are devices that convert the energy of light into electrical power; for example, a panel style device in which plural photovoltaic effect elements are arrayed is used. The solar cells 500 and 501 are installed on a place in the sun such as a window frame on the outdoor side. If the insolation is small, an auxiliary power source may be provided.

Next, explained is the controlling of intake-exhaust behavior in the double skin system that uses the intake-exhaust unit. FIG. 2(a) is a side view to show the aspect of the controlling of the intake-exhaust to be implemented in a winter season; FIG. 2(b) is a side view to show the aspect of the controlling of the intake-exhaust to be implemented in a summer season; FIG. 2(c) is a side view to show the aspect of the controlling of the intake-exhaust to be implemented in an intermediate season.

As shown in FIG. 2(a), since the winter season is cold, the cold outdoor air is not taken in, the cold indoor air is sent into the intermediate cavity 230 of the double skin 200. The air sent into the intermediate cavity 230 is warmed by the insolation and the warmed air is returned into the indoor to supply the warm air in the indoor. Specifically, first, the solar cell 501 drives the lower intake-exhaust unit 301 and the solar cell 500 drives the upper intake-exhaust unit 300.

Then, the intake-exhaust unit 301 takes in the indoor air through the inner vent port 411 and sends that air into the intermediate cavity 230 through the middle vent port 421. The heat of insolation is transferred from the outdoor into the intermediate cavity 230 through the exterior glass 210 but the heat is not transferred from the intermediate cavity 230 into the indoor through the interior glass 220; thus, the air in the intermediate cavity 230 is gradually warmed. The intake-exhaust unit 300 takes in the air in the intermediate cavity 230 through the middle vent port 420 and send that air into the indoor through the inner vent port 410.

With this, the air in a room is warmed and use of heating devices is reduced. That is, the heat efficiency is improved and the energy efficiency is improved also. In addition, in the case of an existing window, the temperature of a place near the window rises by insolation even in the winter season, and such place becomes very hot when the heating effect is added. However, if the warm air is circulated, it is possible to prevent that only the window side becomes hot.

Since summer is hot, cooling equipment is used in a room. As shown in FIG. 2(b) therefore, the indoor air is prevented from escaping to the outdoor, the air warmed in the intermediate cavity 230 is discharged to the outdoor; and separate air is taken in the intermediate cavity 230 from the outdoor. Specifically, first, the solar cell 501 drives the lower intake-exhaust unit 301 and the solar cell 500 drives the upper intake-exhaust unit 300.

Then, the intake-exhaust unit 301 takes in the outdoor air through the outer vent port 401 and sends that air into the intermediate cavity 230 through the middle vent port 421. The air in the intermediate cavity 230 is gradually warmed by the heat of insolation. The intake-exhaust unit 300 takes in the air in the intermediate cavity 230 through the middle vent port 420 and discharges the air to the outdoor through the outer vent port 400. That is, the air in the intermediate cavity 230 is circulated and heat dissipates at the same time.

With this, heat is not accumulated in the intermediate cavity 230; accordingly transferring of heat into the indoor is hard to occur and the cooling effect is maintained. That is, the use of cooling equipment is reduced, improving the heat efficiency and energy efficiency also. In addition, in the case of an existing window, the temperature of a place by a window in the summer season rises by insolation and the cooling effect is weakened. If the air circulates and the heat is not accumulated, temperature rise of the place by the window is reduced and the cooling effect weakening is prevented.

In the intermediate season, spring and autumn, the indoor air and the outdoor air are ventilated; for example, the outdoor air is taken into the indoor or the indoor air is sent out to the outdoor, as shown in FIG. 2(c). Specifically, first, the solar cell 501 drives the lower intake-exhaust unit 301 and the solar cell 500 drives the upper intake-exhaust unit 300. Note that FIG. 2(c) illustrates two modes of the flow of the air for the case of taking in the air into the outdoor from the outdoor.

The first mode is such a case that the outdoor air is taken in after warmed using the intermediate cavity 230 into the indoor. The intake-exhaust unit 301 takes in the outdoor air through the outer vent port 401 and sends the air into the intermediate cavity 230 through the middle vent port 421. The intake-exhaust unit 300 takes in the air in the intermediate cavity 230 through the middle vent port 420 and sends the air into the indoor through the inner vent port 410.

The second mode is such a case that the outdoor air is directly taken in the indoor, without using the intermediate cavity 230. The intake-exhaust unit 301 takes in the outdoor air through the outer vent port 401 and sends the air into the indoor through the inner vent port 411. At the same time, the intake-exhaust unit 300 takes in the outdoor air through the outer vent port 400 and sends the air into the indoor through the inner vent port 410.

As stated above, in the double skin 200, the indoor temperature can be controlled in accordance with the environmental conditions of the outdoors by controlling the flow of the air using the upper intake-exhaust unit 300 and the lower intake-exhaust unit 301. Thereby, not only the room is brought into a comfortable state, but also it is possible to reduce the use of heating and cooling equipment; thus, the heat efficiency and energy efficiency are improved.

Next, a concrete configuration of the double skin system that uses the intake-exhaust unit is explained. FIG. 3 is a block diagram of the configuration of the double skin system that uses the intake-exhaust unit. As explained in FIG. 1, the double skin system 100 has the double skin 200, the upper side intake-exhaust unit 300, and the lower side intake-exhaust unit 301. The double skin 200 has the exterior glass 210, interior glass 220, and the intermediate cavity 240 that is created between them, wherein the air discharged from the intake-exhaust unit 301 rises inside the intermediate cavity 230 and sucked in the intake-exhaust unit 300.

As FIG. 3 shows, the intake-exhaust unit 300 arranged at the top of the double skin 200 has a blowing control module 310, a fan 320, and a storage battery 330. Likewise, the intake-exhaust unit 301 arranged at the bottom of the double skin 200 has a blowing control module 311, a fan 321, and a storage battery 331. The blowing control modules 310 and 311 are parts that have functions for controlling the wind flow; the module has two functions, that is, the intake control in which the air is taken in and the exhaust control in which the air is sent out.

Specifically, the blowing control module 311 takes in the air from the outer vent port 401 or the inner vent port 411 as the intake control behavior and exhausts the air as the exhaust control behavior to the vent port other than the vent port in use for sucking the air, among the outer vent port 401, the inner vent port 411, and the middle vent port 421. In the case where the air is exhausted from the middle vent port 421, the air is sent into the intermediate cavity 240 formed between the exterior glass 210 and interior glass 220. The air in the intermediate cavity 240 forms an upward flow by the exhaust control of the blowing control module 311, the temperature rise due to insolation, and the intake control of the blowing control module 310. The blowing control module 310 takes in the air from any of the outer vent port 401, the inner vent port 411, and the middle vent port 421 as the intake control behavior and exhausts as the exhaust control behavior the air to the vent port other than the vent port in use for sucking the air, among the outer vent port 400 and the inner vent port 410.

The intake control and the exhaust control of the blowing control module 310 is functioned by rotating the fan 320. Likewise, the intake control and the exhaust control of the blowing control module 311 is functioned by rotating the fan 321. The fans 320 and 321 are fans that generate wind by rotating a plurality of blades fitted on a shaft. Such fan includes for example the sirocco fan; the wind volume is controlled by changing the rotation speed. In the blowing control modules 310 and 311, designating respectively the source of the air intake and the destination of the air exhaust makes the intake of the air from the source of intake be performed and makes the air be sent to the destination, by rotating the fans 320 and 321.

The power for the blowing control module 310 and the fan 320 is supplied from the storage battery 330. Likewise, the power for the blowing control module 311 and the fan 321 is supplied from the storage battery 331. The motorized intake-exhaust makes it possible to obtain a stable wind volume not influenced by weather conditions. The storage batteries 330 and 331 are batteries that are available for repeated use by charging.

The double skin 200 is installed mainly in such a place where the influence of the insolation is large. Therefore, the electricity is generated by the solar cell 500, however, the generation may occasionally be reduced; thus, the electricity should be stored in the storage battery 330 when generation is possible. In addition, since the power consumption of the blowing control modules 310 and 311 and the fans 320 and 321 is small, a system such that the power for them is supplied from the storage batteries 330 and 331 can be configured.

With this configuration, it becomes possible to control the flow of the air in the intermediate cavity 240 in the window glass of the double skin 200 by the intake-exhaust units 300 and 301, and taking in the air warmed in the intermediate cavity 240 into the indoor and exhaust such air to the outdoor become practicable. Applying the double skin system 100 that uses the intake-exhaust units 300 and 301 to the window glass of a building is able to improve the heat efficiency of the building.

Embodiment 2

Figure 5A:
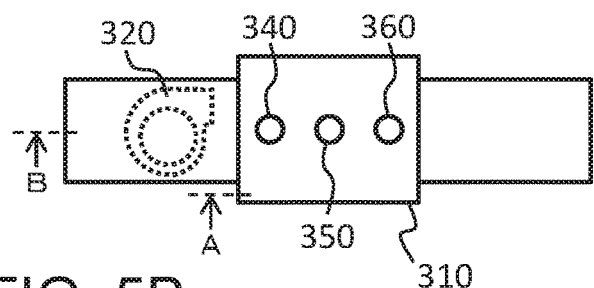
FIG. 5A is a plan view.
Figure 5B:
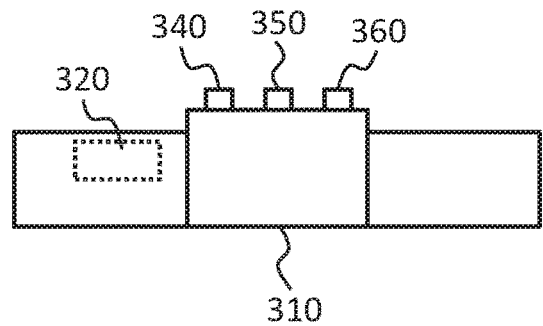
FIG. 5B is a front view.
Figure 5C:
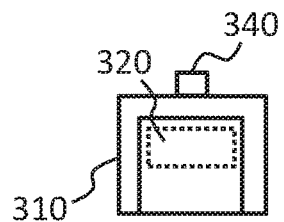
FIG. 5C is a left side view.

Next, the intake-exhaust unit of the present invention is explained.
FIG. 4 is a perspective view of the intake-exhaust unit.
FIG. 5(*a*) is a plan view of the intake-exhaust unit, FIG. 5(*b*) is a front view of the intake-exhaust unit, and FIG. 5(*c*) is a left side view of the intake-exhaust unit.
Since the intake-exhaust unit 300 disposed at the top of the double skin 200 and the intake-exhaust unit 301 disposed on the bottom thereof are same in construction, the explanation deals with the intake-exhaust unit 300.

The intake-exhaust unit 300 has, as explained in FIG. 3, the blowing control module 310 and takes in the air from any of the outer vent port 400, inner vent port 410, and middle vent port 420; and exhausts the air through any of the vent port other than the vent port in use for sucking the air, among the outer vent port 400, the inner vent port 410, and the middle vent port 420.

Therefore, as FIG. 4 shows, three ports for intake-exhaust, that is, a distribution port 340, a distribution port 350, and a distribution port 360 are provided on the blowing control module 310.

In addition, as shown in FIG. 4(*a*), the intake-exhaust unit 300 has the fan 320 and makes the air to flow by wind. The side, from which the air is sucked by the fan 320, is communicated with any of the distribution port 340, the distribution port 350, and the distribution port 360; and the side, into which the fan 320 exhausts the air, is communicated with any of the port other than the distribution port communicated with for sucking, among the distribution port 340, the distribution port 350, and the distribution port 360.

For example, the distribution port 340 is communicated with the outer vent port 400, the distribution port 350 is communicated with the inner vent port 410, and the distribution port 360 is communicated with the middle vent port 420. A fan of such a type that the air below the fan is sucked by the rotation of the blade of the fan and the sucked air is blown out using the centrifugal force from an exhaust port on the side thereof is used as the fan 320, as shown in FIG. 5(*b*). In such case, forming a path from the distribution port 340 to below the fan 320 and further forming another path from the fan 320 to the distribution port 360 sends the air from the outer vent port 400 into the middle vent port 420.

Additionally, the distribution port 340, the distribution port 350, and the distribution port 360 are arranged not to be directly communicated with; they are to be made to communicate with through the fan 320 placed in-between. For example, first, the distribution port 340, the distribution port 350, and the distribution port 360 are partitioned each from the other. Then, the fan 320 is arranged upper side as shown in FIG. 5(*c*) so that the path from the distribution port 340 to the same side as the fan 320 and the path from the distribution port 340 to the underside of the fan 320 are formed severally. Further, the same arrangement is applied to the distribution port 350 and the distribution port 360.

In a state that the outer vent port 400, the inner vent port 410, and the middle vent port 240, which are the communication destination of the distribution ports 340, 350, and 360, are closed, the inside of the intake-exhaust unit 300 becomes a closed path that is almost sealed; this prevents water leakage of internal pressure rise due to a sudden weather change. This means that this state functions as a safety device. In addition, in the case of the intake-exhaust unit 300, the fan 320 secures intake and exhaust of the air; therefore, a filter can be installed.

Figure 6A:
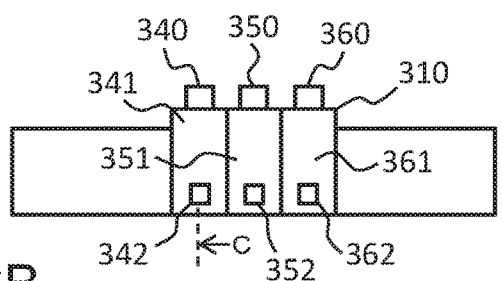
FIG. 6A is a cross-sectional view taken along line A.

Further, the internal configuration of the intake-exhaust unit 300 is explained. FIG. 6(*a*) is a cross-sectional view taken along line A in FIG. 5(*a*), FIG. 6(*b*) is a cross-sectional view taken along line B in FIG. 5(*a*), and FIG. 6(*c*) is a cross-sectional view taken along line C in FIG. 6(*a*). FIG. 7(*a*) is a cross-sectional view taken along line D in FIG. 6(*b*) and FIG. 7(*b*) is a cross-sectional view taken along line E in FIG. 6(*b*).

As shown in FIG. 6(*a*), inside the blowing control module 310, the distribution port 340, the distribution port 350, and the distribution port 360 are sectioned by partitions into a sectioned passage 341, a sectioned passage 351, and a sectioned passage 361. Further, as shown in FIG. 6(*b*), the negative-pressure passage 370 on the lower side, the pressure of which is lowered by the air sucking of the fan 320, and a positive-pressure passage 380 on the upper side, the pressure of which is high by the air sent from the fan 320, are sectioned using the fan 320 as a border.

Moreover, as shown in FIG. 6(*a*), an intake hole 342, an intake hole 352, and an intake hole 362 are provided as a means for communicating the negative-pressure passage 370 with the sectioned passage 341, the sectioned passage 351, and the sectioned passage 361. As shown in FIG. 6(*b*), an exhaust hole 343, an exhaust hole 353, and an exhaust hole 363 are provided as a means for communicating the positive-pressure passage 380 with the sectioned passage 341, the sectioned passage 351, and the sectioned passage 361.

Figure 6C:
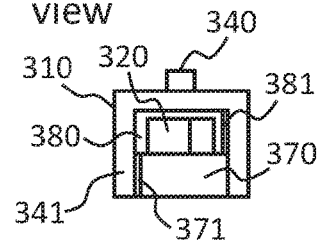
FIG. 6C is a cross-sectional view taken along line C.
Figure 6B:
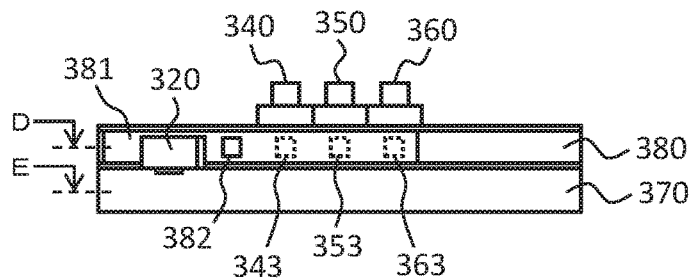
FIG. 6B is a cross-sectional view taken along line B.
Figure 7A:
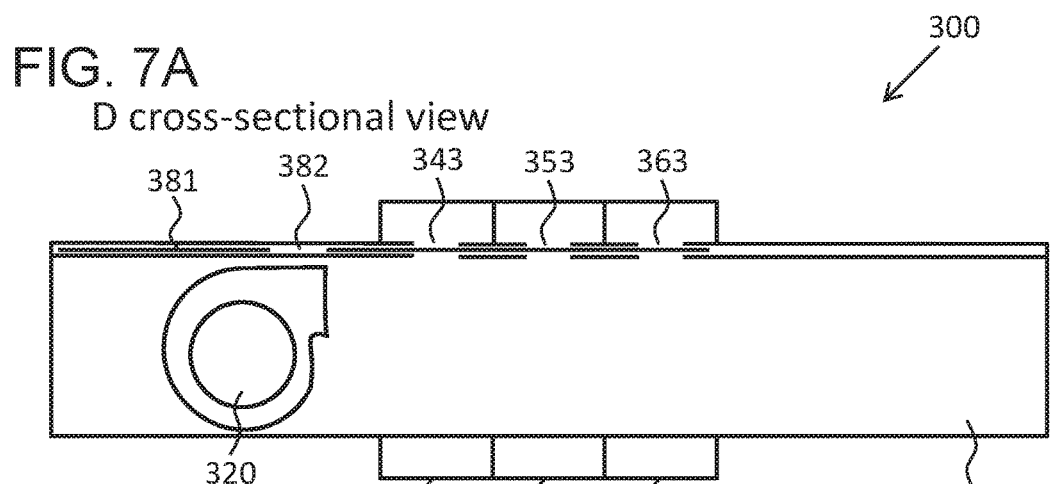
FIG. 7A is a cross-sectional view taken along line D and FIG. 7B is a cross-sectional view taken along line E.
Figure 7B:
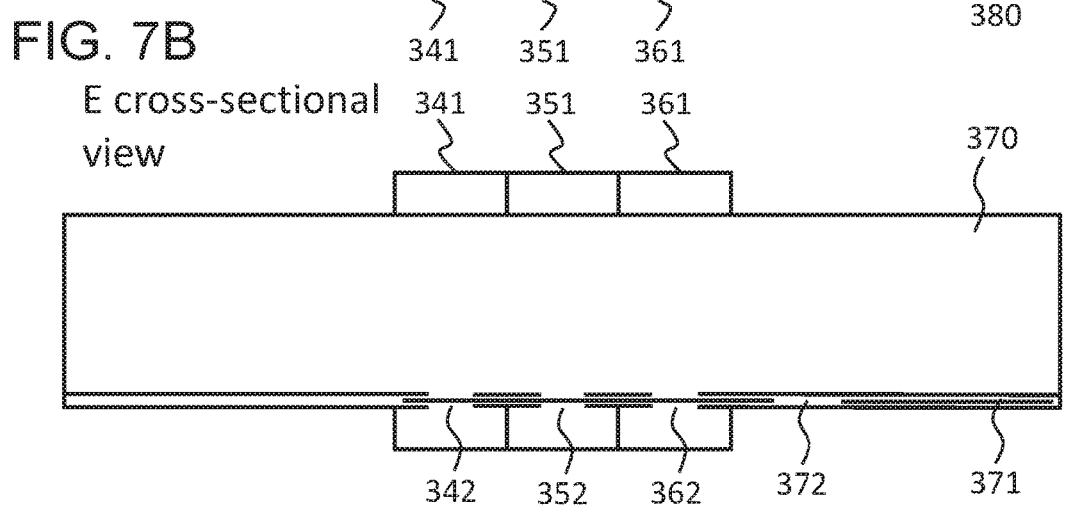

As shown in FIG. 6(c), the sectioned passages 341, 351, and 361 are formed on a path from the distribution ports 340, 350, and 360 to the front, and on a path from the distribution ports 340, 350, and 360 to the rear. Therefore, the intake hole 342, the intake hole 352, and the intake hole 362 are provided in the lower side which is in the front of the sectioned passage 341, the sectioned passage 351, and the sectioned passage 361 and communicates with the negative-pressure passage 370, as shown in FIG. 6(a). Further, the exhaust hole 343, the exhaust hole 353, and the exhaust hole 363 are provided in the upper side which is in the rear of the sectioned passage 341, the sectioned passage 351, and the sectioned passage 380 and communicates with the positive-pressure passage 380, as shown in FIG. 6(b).

In the front of the negative-pressure passage 370, a shutter 371 is provided. The shutter 371 is a slidable plate material and has a hole 372. Sliding the shutter 371 in a transverse direction enables to shut to close all the intake hole 342, the intake hole 352, and the intake hole 362, or enables to open any of the intake hole 342, the intake hole 352, and the intake hole 362 by aligning the hole 372.

Likewise, in the rear of the positive-pressure passage 380, a shutter 381 is provided. The shutter 381 is a slidable plate material and has a hole 382. Sliding the shutter 381 in a transverse direction enables to shut to close all the exhaust hole 343, the exhaust hole 353, and the exhaust hole 363, or enables to open any of the exhaust hole 343, the exhaust hole 353, and the exhaust hole 363 by aligning the hole 382.

For example, the hole 372 of the shutter 371 is aligned with the intake hole 342 in the negative-pressure passage 370, and the hole 382 of the shutter 381 is aligned with the exhaust hole 363 in the positive-pressure passage 380. In this case, the air flows along the path formed in the order of the distribution port 340, the front side of the sectioned passage 341, the intake hole 342, the negative-pressure passage 370, the fan 320, the positive-pressure passage 380, the exhaust hole 363, the rear side of the sectioned passage 361, and the distribution port 360.

The intake-exhaust unit 300 further has the built-in storage battery 330. The storage battery 330 stores the power generated by the solar cell 500 and supplies stored power to drive the fan 320 and shutters 371 and 381 when needed. The blowing control module 310 also includes a driving means to slide the shutters 371 and 381, a memory means to register the position to which the shutters 371 and 381 are to move, a control means for controlling the movement of the shutters 371 and 381.

Use of the intake-exhaust unit 300 in a window glass of the double skin structure enables the control of the air flow among the outdoor, the indoor, and the intermediate cavity of the double skin 200. That is, it is possible to make the air flow in any of the path: from the outdoor to the indoor, from the outdoor to the intermediate cavity 240; from the indoor to the outdoor, from the indoor to the intermediate cavity 240; and from the intermediate cavity 240 to the outdoor, from the intermediate cavity 240 to the indoor.

The intake-exhaust unit 300 is configured in a module. Therefore, by shutting the connection of the connecting means (piping for example) that connects the distribution ports 340, 350, and 360 with the outer vent port 400, the inner vent port 410, and the middle vent port 420, the intake-exhaust unit 300 itself can be easily detached. The detached intake-exhaust unit 300 can be repaired or replaced to perform the maintenance. This means that the intake-exhaust unit 300 can be produced in the mass-production by standardization as a general-purpose device; consequently, the manufacturing cost of the intake-exhaust unit 300 can be largely cut.

Embodiment 3

Next, a method of changing the flow of air using the intake-exhaust unit is explained. In the case where the double skin system 100 is employed in a building, a change-over switch may be provided on each of the double skins 200 to select and change the setting conditions of each of the double skins 200; a remote control device for changing may be provided for changing the setting condition of all the double skins 200 of a room. Further, a changing operation box may be provided for selecting and changing the setting conditions of the double skin 200 of each floor or of the entire building.

When the setting conditions are changed, the power is supplied to the blowing control modules 310 and 311 from the storage batteries 330 and 331 of the intake-exhaust units 300 and 301; then, the shutter 371 of the negative-pressure passage 370 and the shutter 381 of the positive-pressure passage 380 slide to the predetermined position and the fan 320 that flows the air is driven where flowing the air is demanded. The combination of configuration of the setting of the intake-exhaust unit 300 on the upper side with the setting conditions of the intake-exhaust unit 301 on the lower side forms the flow of the air in the double skin 200. Registering the setting as the operation mode enables changing the intake-exhaust control easily and quickly by a simple operation.

FIGS. 8 to 13 illustrate the operation of the intake-exhaust unit. In each of these, the figure of title preceded by "(a)" illustrates the operation of the upper side intake-exhaust unit and preceded by "(b)" illustrates the operation of the lower side intake-exhaust unit. In each illustration, the figure at the intermediate position is a plan view of the intake exhaust unit, the figure at the lower position is a cross-sectional view taken along line A in the plan view, the figure at the upper position is a cross-sectional view taken along line B in the plan view, and the figure on the right side is a cross-sectional view taken along line C in the plan view.

Figure 8A:
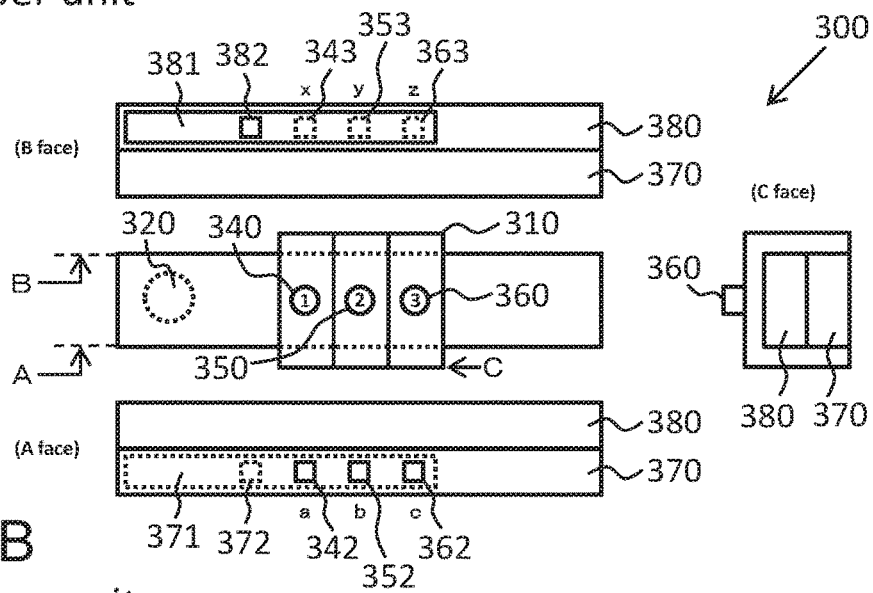
FIG. 8A illustrates working of the upper unit and FIG. 8B illustrates working of the lower unit.
Figure 8B:
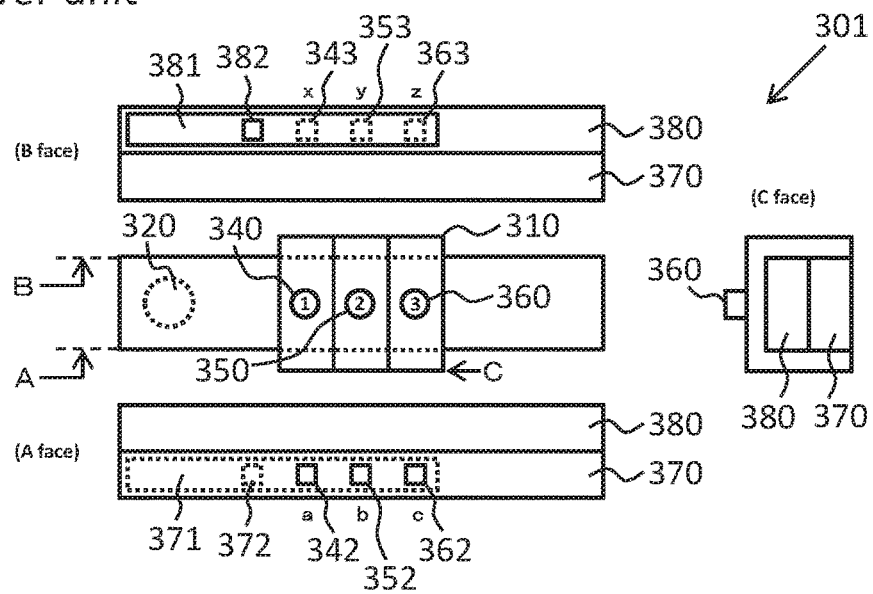

FIG. 8 shows an example of a setting such that the flow of the air is not controlled, which setting would be selected for the case with less insolation in winter season for example. In the intake-exhaust unit 300, every intake holes 342, 352, and 362 of the negative-pressure passage 370 is in the closed state and every exhaust holes 343, 353, and 363 of the positive-pressure passage 380 is in the closed state. The fan 320 is not driven, and every distribution ports 340, 350, 360 does not make intake and exhaust of the air.

In the intake-exhaust unit 301, every intake holes 342, 352, and 362 of the negative-pressure passage 370 is in the closed state and every exhaust holes 343, 353, and 363 of the positive-pressure passage 380 is in the closed state. The fan 320 is not driven, and every distribution ports 340, 350, 360 does not make intake and exhaust of the air.

Figure 9A:
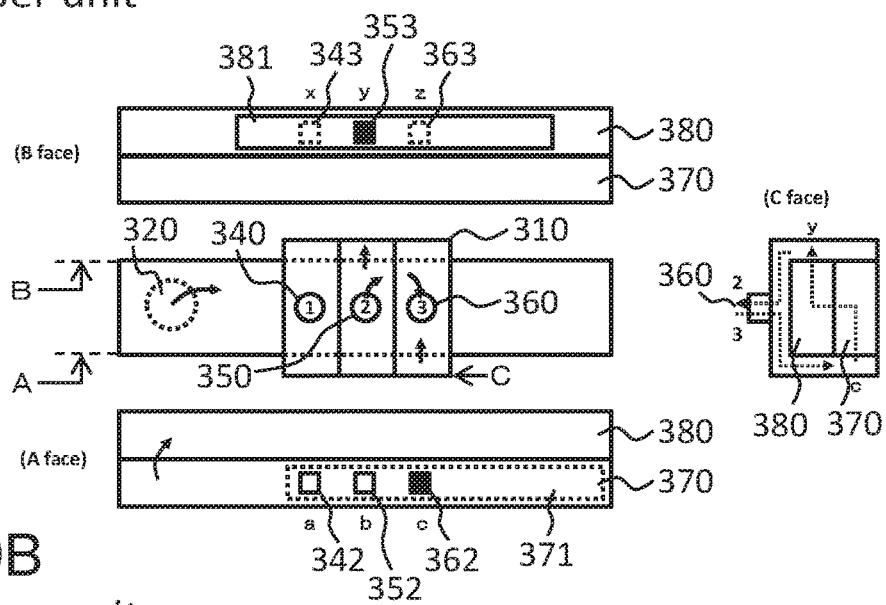
FIG. 9A illustrates working of the upper unit and FIG. 9B illustrates working of the lower unit.
Figure 9B:
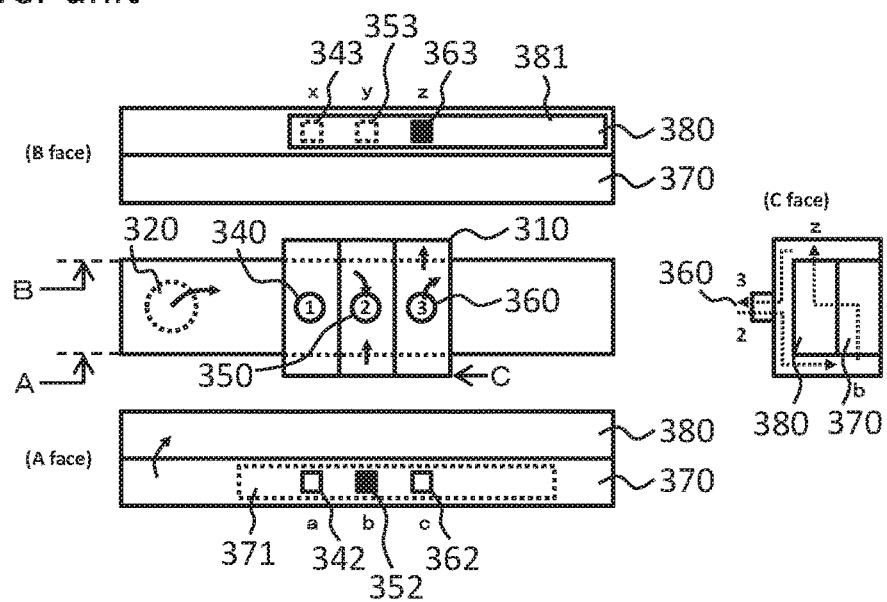

FIG. 9 shows an example of a setting such that the indoor air is warmed in the intermediate cavity 240 and returned to the indoor, which setting would be selected for the case with insolation in winter season for example. In the intake-exhaust unit 300, an intake hole 362(c) on the negative-pressure passage 370 opens and an exhaust hole 353(y) on the positive-pressure passage 380 opens. By driving the fan 320, the intake is performed at a distribution port 360 (3) and the exhaust is carried out at a distribution port 350 (2). In the intake-exhaust unit 301, an intake hole 352(b) on the negative-pressure passage 370 opens and an exhaust hole 353(y) on the positive-pressure passage 380 opens. By driving the fan 320, the intake is performed at a distribution port 350 (2) and the exhaust is carried out at a distribution port 360 (3).

In each of the intake-exhaust units 300 and 301, a distribution port 340 (1) is communicated with the outdoor, the distribution port 350 (2) is communicated with the indoor, and the distribution port 360 (3) is communicated with the intermediate cavity 230. In such case, first, in the lower side intake-exhaust unit 301, the air flows along the path formed in the order of the indoor, the distribution port 350 (2), the intake hole 352(b), the negative-pressure passage 370, the fan 320, the positive-pressure passage 380, an exhaust hole 363(z), the distribution port 360 (3), and the intermediate cavity 230. Next, in the upper side intake-exhaust unit 300, the air flows along the path formed in the order of the intermediate cavity 230, the distribution port 360 (3), intake hole 362(c), the negative-pressure passage 370, the fan 320, the positive-pressure passage 380, the exhaust hole 353(y), the distribution port 350 (2), and the indoor.

Figure 10A:
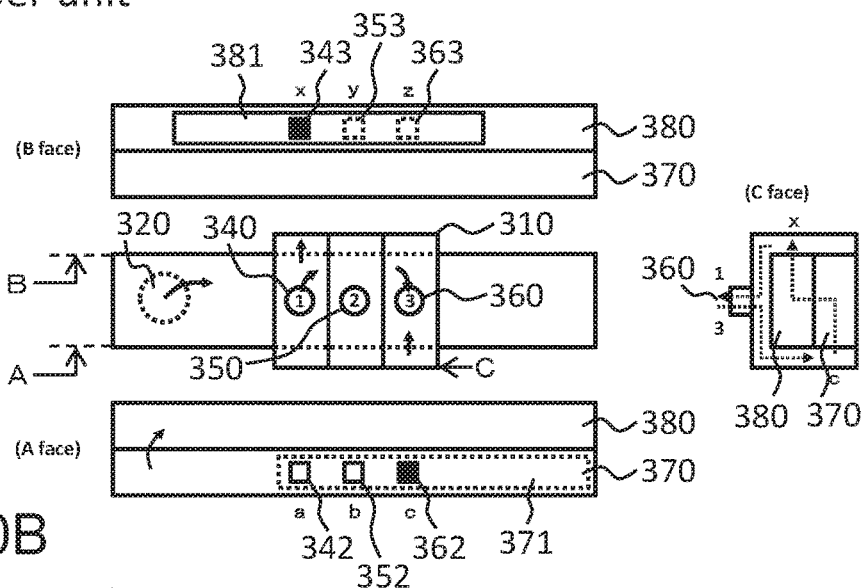
FIG. 10A illustrates working of the upper unit and FIG. 10B illustrates working of the lower unit.
Figure 10B:
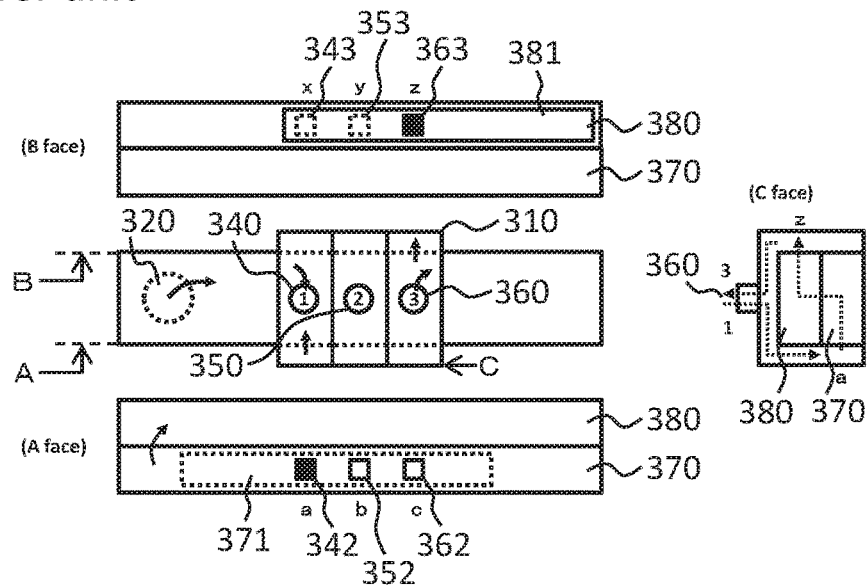

FIG. 10 shows an example of a setting such that the air warmed in the intermediate cavity 240 is discharged to the outdoor and another air is taken in the intermediate cavity 240 from the outdoor, which setting would be selected for the case with insolation in summer season for example. In the intake-exhaust unit 300, the intake hole 362(c) on the negative-pressure passage 370 opens and the exhaust hole 343(x) on the positive-pressure passage 380 opens. By driving the fan 320, the intake is performed at the distribution port 360 (3) and the exhaust is carried out at the distribution port 354 (1). Further, in the intake-exhaust unit 301, the intake hole 342(a) on the negative-pressure passage 370 opens and the exhaust hole 363(z) on the positive-pressure passage 380 opens. By driving the fan 320, the intake is performed at the distribution port 340 (1) and the exhaust is carried out at the distribution port 360 (3).

First, in the lower side intake-exhaust unit 301, the air flows along the path formed in the order of the outdoor, the distribution port 340 (1), the intake hole 342(a), the negative-pressure passage 370, the fan 320, the positive-pressure passage 380, a exhaust hole 363(z), the distribution port 360 (3), and the intermediate cavity 230. Next, in the upper side intake-exhaust unit 300, the air flows along the path formed in the order of the intermediate cavity 230, the distribution port 360 (3), intake hole 362(c), the negative-pressure passage 370, the fan 320, the positive-pressure passage 380, the exhaust hole 343(x), the distribution port 340 (1), and the outdoor.

Figure 11A:
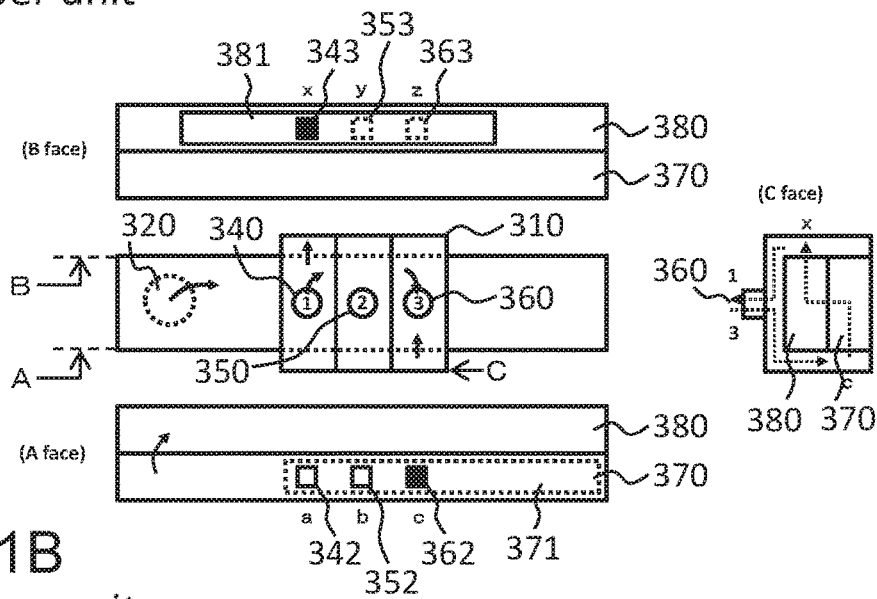
FIG. 11A illustrates working of the upper unit and FIG. 11B illustrates working of the lower unit.
Figure 11B:
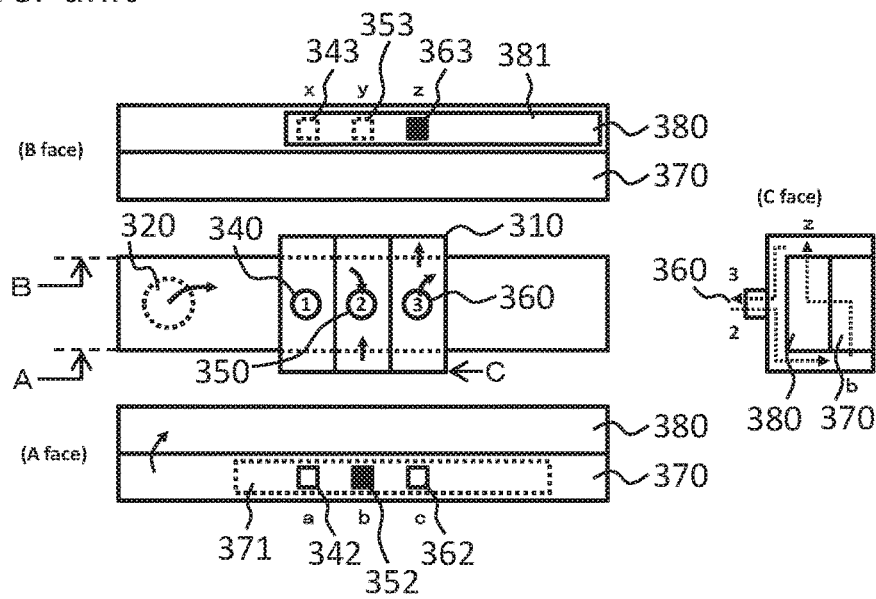

FIG. 11 shows an example of a setting such that the air warmed in the intermediate cavity 240 is discharged to the outdoor and another air is taken in the intermediate cavity 240 from the indoor, which setting would be selected also for the case with the insolation in summer season for example. In the intake-exhaust unit 300, the intake hole 362(c) on the negative-pressure passage 370 opens and the exhaust hole 343(x) on the positive-pressure passage 380 opens. By driving the fan 320, the intake is performed at the distribution port 360 (3) and the exhaust is carried out at the distribution port 340 (1). Further, in the intake-exhaust unit 301, the intake hole 352(b) on the negative-pressure passage 370 opens and the exhaust hole 363(z) on the positive-pressure passage 380 opens. By driving the fan 320, the intake is performed at the distribution port 350 (2) and the exhaust is carried out at the distribution port 360 (3).

First, in the lower side intake-exhaust unit 301, the air flows along the path formed in the order of the indoor, the distribution port 350 (2), the intake hole 352(b), the negative-pressure passage 370, the fan 320, the positive-pressure passage 380, the exhaust hole 363(z), the distribution port 360 (3), and the intermediate cavity 230. Next, in the upper side intake-exhaust unit 300, the air flows along the path formed in the order of the intermediate cavity 230, the distribution port 360 (3), intake hole 362(c), the negative-pressure passage 370, the fan 320, the positive-pressure passage 380, the exhaust hole 343(x), the distribution port 340 (1), and the outdoor.

Figure 12A:
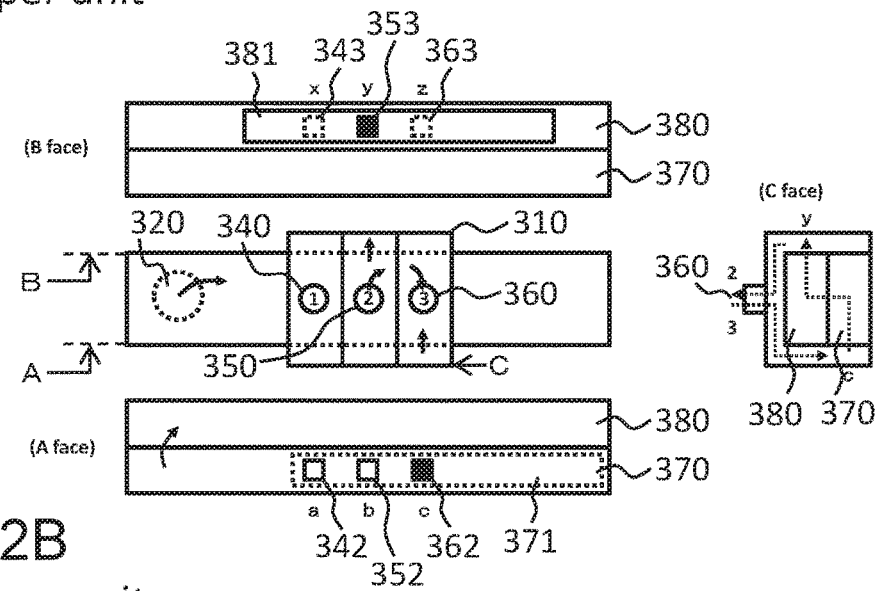
FIG. 12A illustrates working of the upper unit and FIG. 12B illustrates working of the lower unit.
Figure 12B:
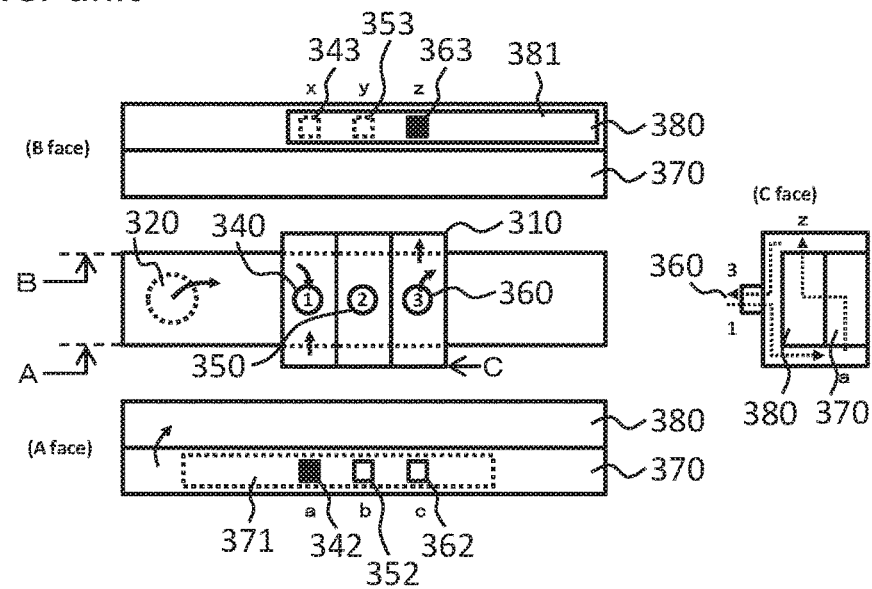

FIG. 12 shows an example of a setting such that the outdoor air is warmed in the intermediate cavity 240 to be taken into the indoor, which setting would be selected for the case of intermediate season for example. In the intake-exhaust unit 300, the intake hole 362(c) on the negative-pressure passage 370 opens and the exhaust hole 353(y) on the positive-pressure passage 380 opens. By driving the fan 320, the intake is performed at the distribution port 360 (3) and the exhaust is carried out at the distribution port 350 (2). Further, in the intake-exhaust unit 301, the intake hole 342(a) on the negative-pressure passage 370 opens and the exhaust hole 363(z) on the positive-pressure passage 380 opens. By driving the fan 320, the intake is performed at the distribution port 340 (1) and the exhaust is carried out at the distribution port 360 (3).

First, in the lower side intake-exhaust unit 301, the air flows along the path formed in the order of the outdoor, the distribution port 340 (1), intake hole 342(a), the negative-pressure passage 370, the fan 320, the positive-pressure passage 380, the exhaust hole 363(z), the distribution port 360 (3), and the intermediate cavity 230. Next, in the upper side intake-exhaust unit 300, the air flows along the path formed in the order of the intermediate cavity 230, the distribution port 360 (3), the intake hole 362(c), the negative-pressure passage 370, the fan 320, the positive-pressure passage 380, the exhaust hole 353(y), the distribution port 350 (2), and the outdoor.

Figure 13A:
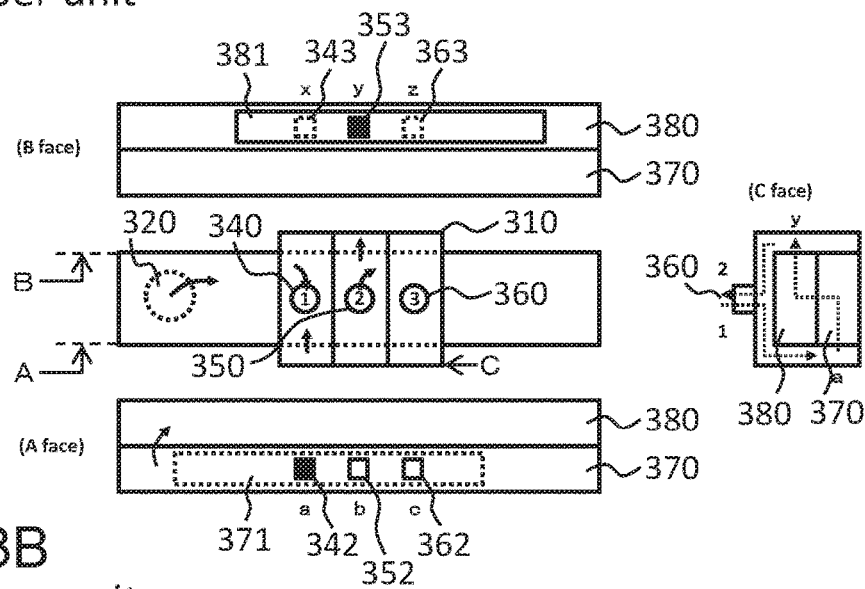
FIG. 13A illustrates working of the upper unit and FIG. 13B illustrates working of the lower unit.
Figure 13B:
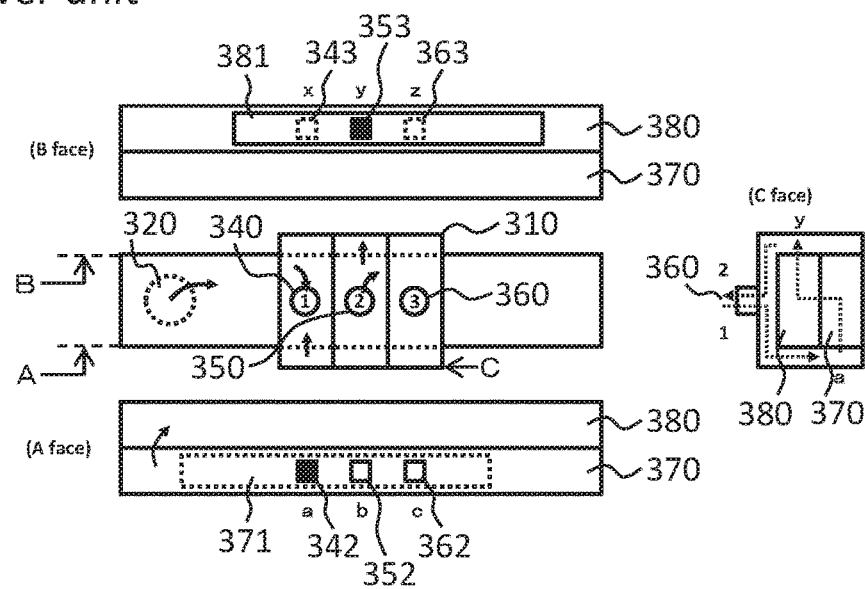

FIG. 13 shows an example of a setting such that the outdoor air as-is is taken in the indoor, which setting would be selected for the case of a ventilation in intermediate season for example. In the intake-exhaust unit 300, the intake hole 342(a) on the negative-pressure passage 370 opens and the exhaust hole 353(y) on the positive-pressure passage 380 opens. By driving the fan 320, the intake is performed at the distribution port 340 (1) and the exhaust is carried out at the distribution port 350 (2). Further, in the intake-exhaust unit 301, the intake hole 342(a) on the negative-pressure passage 370 opens and the exhaust hole 353(y) on the positive-pressure passage 380 opens. By driving the fan 320, the intake is performed at the distribution port 340 (1) and the exhaust is carried out at the distribution port 350 (2).

First, in the lower side intake-exhaust unit 301, the air flows along the path formed in the order of the outdoor, the distribution port 340 (1), intake hole 342(a), the negative-pressure passage 370, the fan 320, the positive-pressure passage 380, the exhaust hole 353(y), the distribution port 350 (2), and the indoor. Further, in the upper side intake-exhaust unit 300, the air flows along the path formed in the order of the outdoor, the distribution port 340 (1), the intake hole 342(a), the negative-pressure passage 370, the fan 320, the positive-pressure passage 380, the exhaust hole 353(y), the distribution port 350 (2), and the indoor.

Setting plural operation patterns of the intake-exhaust units 300 and 301 in advance and changing selectively the operation pattern enable creation of a condition with good heat efficiency and good energy efficiency in a building that employs the window glass of a double skin. Further, the environment in the building can be maintained always comfortable by automatically regulating to the optimum setting condition detecting temperature and humidity by sensors.

The intake-exhaust units 300 and 301 are able to control the flow of the air with a simple construction. Using the intake-exhaust units 300 and 301, a curtain wall of double skin structure can be easily constructed. Making the intake-exhaust units 300 and 301 be general-purpose parts reduces the installation cost and eases maintenance, allowing such as efficient use of heat and energy; thus, the provided effects are great.

Modification Example

Embodiments of the present invention are thus described, but embodiments are not limited thereto. For example, not only installing a window glass of the double-skin system 100 using the double skin 200 having the intake-exhaust units 300 and 301 in a building, but the double skin system 100 may be constructed providing the intake-exhaust units 300 and 301 on a double skin structure that is configured by placing an interior glass on the indoor side of an existing window glass consisting of a single plate glass, or by placing an exterior glass on the outdoor side.

In addition, the double skin 200 may employ not only a combination of the exterior glass 210 of a plate glass with the interior glass 220 of a double-glazing, but a configuration such that each of the exterior glass 210 and the interior glass 220 uses the same plate glass, or a configuration such that each of the exterior glass 210 and the interior glass 220 uses a double-glazing, or, a combination of the exterior glass 210 of a double-glazing with the interior glass 220 of a plate glass.

Further, if the intake-exhaust units 300 and 301 are capable of performing intake and exhaust of the air, the unit may be omitted to the upper side intake-exhaust unit 300 only or to the lower side intake-exhaust unit 301 only. In addition, in FIG. 3, the flow of the air may be controlled not only on the path of the intake-exhaust unit 301, the intermediate cavity 230, and the intake-exhaust unit 300, but may be controlled on the reverse path of the intake-exhaust unit 300, the intermediate cavity 230, and the intake-exhaust unit 301. Further, it is not always necessary that the intake-exhaust unit 300 and the intake-exhaust unit 301 are same device; a separate device may be used where the device can demonstrate the same function as the intake-exhaust unit 300 and the intake-exhaust unit 301 have.

Any one of distribution ports 340 and 350 of the intake-exhaust unit 300 is communicated with the sucking side, and the one other than working on the sucking side is communicated with the exhaust side. The rest one may be designed to be communicated with either sucking side or the exhaust side. Additionally, the number of the hole 372 on the shutter 371 or the number of the hole 382 on the shutter 381 may be increased to disperse the flow of the air.

In the double skin 200, it can be practicable to handle the double skin 200 and the exchangeable intake-exhaust units 300 and 301 as one group, by installing the intake-exhaust units 300 and 301 in a sash frame. It also can be practicable to install the intake-exhaust units 300 and 301 on the ceiling or floor to allow separate handling the double skin 200 and the exchangeable intake-exhaust units 300 and 310. Easy exchange of the double skin 200 with a single skin may become possible.

REFERENCE SIGNS LIST

100: . . . Double skin system
200: . . . Double skin
210: . . . Exterior glass
220: . . . Interior glass
230: . . . Intermediate cavity
240: . . . Blind
300, 301: . . . Intake-exhaust unit
310, 311: . . . Blowing control module
320, 321: . . . Fan
330, 331: . . . Storage battery
340, 350, 360: . . . Distribution port
341, 351, 361: . . . Sectioned passage
342, 352, 362: . . . Intake hole
343, 353, 363: . . . Exhaust hole
370: . . . Negative-pressure passage
371: . . . Shutter
372: . . . Hole
380: . . . Positive-pressure passage
381: . . . Shutter
382: . . . Hole
400, 401: . . . Outer vent port
410, 411: . . . Inner vent port
420, 421: . . . Middle vent port
500, 501: . . . Solar cell

The invention claimed is:

1. An intake-exhaust unit comprising:
a first distribution port of passage of the air;
a second distribution port of passage of the air, the second distribution port being separated from the first distribution port;
a third distribution port of passage of the air, the third distribution port being separated from the first distribution port and the second distribution port;
a fan for sending out the sucked air;
a negative-pressure passage provided on the air-intake side of the fan, the negative-pressure passage having
a first intake hole that communicates with the first distribution port,
a second intake hole that communicates with the second distribution port, and
a third intake hole that communicates with the third distribution port;
a positive-pressure passage provided on the air exhausting side of the fan, the positive-pressure passage having
a first exhaust hole connected to the first distribution port,
a second exhaust hole connected to the second distribution port, and
a third exhaust hole connected to the third distribution port;
a negative-pressure passage side shutter having a hole provided slidably on the negative-pressure passage;
a positive-pressure passage side shutter having a hole provided slidably on the positive-pressure passage; and
a blowing control module for driving the negative-pressure passage side shutter and the positive-pressure passage side shutter;
wherein
the blowing control module slides the negative-pressure passage side shutter so that the hole of the negative-pressure passage side shutter matches to any of the first intake hole, the second intake hole, and the third intake hole, thereby the negative-pressure passage is communicated with any of the first distribution port, the second distribution port, and the third distribution port;

wherein the blowing control module slides the positive-pressure passage side shutter so that the hole of the positive-pressure passage side shutter matches to any of the first exhaust hole, the second exhaust hole, and the third exhaust hole, thereby the positive-pressure passage is communicated with any of the distribution ports other than the one communicated with the negative-pressure passage, among the first distribution port, the second distribution port, and the third distribution port; and wherein the air is taken in through the negative-pressure passage to the fan from any of the first distribution port, the second distribution port, and the third distribution port, and the sucked air is then sent out to any of the distribution ports other than the one in use for the air sucking, among the first distribution port, the second distribution port, and the third distribution port.

2. The intake-exhaust unit according to claim 1, wherein the negative-pressure passage is partitioned into the lower side and the positive-pressure passage is partitioned into the upper side, considering the fan to be a border;

the first distribution port and the first intake hole, and the first distribution port and the first exhaust hole are communicated via a first sectioned passage, the second distribution port and the second intake hole, and the second distribution port and the second exhaust hole are communicated via a second sectioned passage, and the third distribution port and the third intake hole, and the third distribution port and the third exhaust hole are communicated via a third sectioned passage;

the first intake hole, the second intake hole, and the third intake hole are provided in the lower side of front of each of the first sectioned passage, the second sectioned passage, and the third sectioned passage, wherein the lower side is communicated with the negative-pressure passage; and the first exhaust hole, the second exhaust hole, and the third exhaust hole are provided in the upper side of rear of each of the first sectioned passage, the second sectioned passage, and the third sectioned passage, wherein the upper side is communicated with the positive-pressure passage.

3. The intake-exhaust unit according to claim 1, wherein the unit has a storage battery that stores electricity generated by a solar cell and supplies the power to the blowing control module that drives the fan, the negative-pressure passage side shutter, and the positive-pressure passage side shutter, wherein the blowing control module slides the negative-pressure passage side shutter and the positive-pressure passage side shutter in accordance with a predetermined movement pattern.

4. A double skin system, wherein the intake-exhausting unit according to claim 1 is arranged on the top and the bottom of a window glass having a double skin structure comprised of an exterior glass arranged on the outdoor side, an interior glass arranged on the indoor side, and an intermediate cavity created by the exterior glass and the interior glass, wherein the intake-exhaust unit sucks and exhausts the air among the outdoor side, the indoor side, and the intermediate cavity.

5. A double skin system according to claim 4, wherein the intake-exhaust unit arranged on the bottom exhausts the air sucked from the outdoor side or the indoor side into the intermediate cavity and the intake-exhaust unit arranged on the top exhausts the air sucked from the intermediate cavity into the outdoor side or the indoor side.

* * * * *